(12) United States Patent
Meyers

(10) Patent No.: US 10,547,814 B1
(45) Date of Patent: Jan. 28, 2020

(54) CAMERA GLASSES

(71) Applicant: Leo Meyers, Baton Rouge, LA (US)

(72) Inventor: Leo Meyers, Baton Rouge, LA (US)

(*) Notice: Subject to any disclaimer, the term of this patent is extended or adjusted under 35 U.S.C. 154(b) by 408 days.

(21) Appl. No.: 15/484,228

(22) Filed: Apr. 11, 2017

(51) Int. Cl.
*H04N 7/18* (2006.01)
*H04N 5/77* (2006.01)
*G03B 17/56* (2006.01)
*H04N 5/225* (2006.01)
*H04N 5/775* (2006.01)
*F16M 13/04* (2006.01)
*G02C 11/00* (2006.01)
*G08B 3/10* (2006.01)
*G08B 21/02* (2006.01)

(52) U.S. Cl.
CPC ........... *H04N 7/181* (2013.01); *F16M 13/04* (2013.01); *G02C 11/10* (2013.01); *G03B 17/561* (2013.01); *G08B 3/10* (2013.01); *G08B 21/02* (2013.01); *H04N 5/2256* (2013.01); *H04N 5/77* (2013.01); *H04N 5/775* (2013.01)

(58) Field of Classification Search
CPC ......... H04N 7/181; H04N 5/77; H04N 5/775; H04N 5/2256; G03B 17/561; G08B 21/02; G08B 3/10; G02C 11/10; F16M 13/04
See application file for complete search history.

(56) References Cited

U.S. PATENT DOCUMENTS

| | | |
|---|---|---|
| 3,936,605 A | 2/1976 | Upton |
| 6,349,001 B1 | 2/2002 | Spitzer |
| 6,549,231 B1 | 4/2003 | Matsui |
| 7,484,847 B2 | 2/2009 | Fuziak, Jr. |
| 7,500,747 B2 | 3/2009 | Howell |
| 2002/0030637 A1* | 3/2002 | Mann .................. G02B 27/017 345/8 |
| 2004/0164896 A1* | 8/2004 | Evans .................. G01S 5/0027 342/357.31 |
| 2012/0075168 A1* | 3/2012 | Osterhout ............ G02B 27/017 345/8 |
| 2014/0266988 A1 | 9/2014 | Fisher |

FOREIGN PATENT DOCUMENTS

CN 203259740 10/2013

* cited by examiner

*Primary Examiner* — Oschta I Montoya

(57) ABSTRACT

The camera glasses are a personal security device adapted for use with eyeglasses. The camera glasses are fitted with a plurality of cameras that are configured to record the surroundings of the user. Each of the plurality of cameras are mounted on the eyeglasses such that one or more front cameras record a video recording of the activities in front of the user while one or more back cameras record a video recording of the activities behind the user. The camera glasses may be placed in a recording mode. Alternatively a "panic" switch is provided that will initiate video recordings from all of the plurality of cameras. In addition, the "panic" switch will initiate an audio recording of the situation and activate an audible alarm in order to draw attention to a potentially dangerous situation. The camera glasses comprises a plurality of cameras, eyeglasses, and a recording unit.

15 Claims, 4 Drawing Sheets

CAMERA GLASSES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of optical devices including spectacles, sunglasses, goggles, more specifically, an optical adjunct adapted for use with spectacles.

SUMMARY OF INVENTION

The camera glasses are a personal security device that is adapted for use with eyeglasses. The camera glasses are fitted with a plurality of cameras that are configured to record the surroundings of the user. Each of the plurality of cameras are mounted on the eyeglasses such that one or more front cameras record a video recording of the activities in front of the user while one or more back cameras record a video recording of the activities behind the user. The camera glasses may be placed in a recording mode. Alternatively a "panic" switch is provided that will initiate video recordings from all of the plurality of cameras. In addition, the "panic" switch will initiate an audio recording of the situation and activate an audible alarm in order to draw attention to a potentially dangerous situation.

These together with additional objects, features and advantages of the camera glasses will be readily apparent to those of ordinary skill in the art upon reading the following detailed description of the presently preferred, but nonetheless illustrative, embodiments when taken in conjunction with the accompanying drawings.

In this respect, before explaining the current embodiments of the camera glasses in detail, it is to be understood that the camera glasses is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the camera glasses.

It is therefore important that the claims be regarded as including such equivalent construction insofar as they do not depart from the spirit and scope of the camera glasses. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
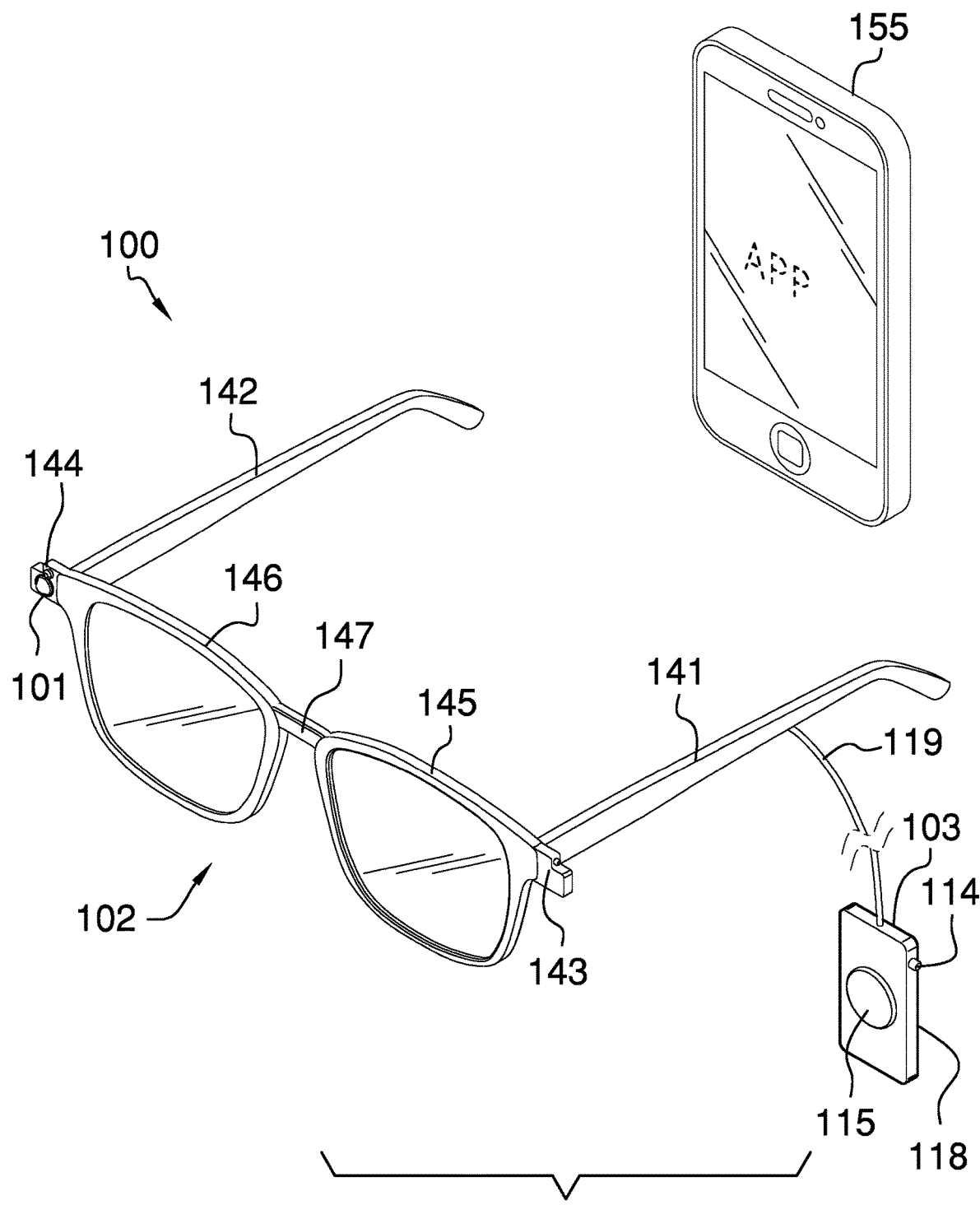
FIG. 1 is a perspective view of an embodiment of the disclosure.
Figure 2:
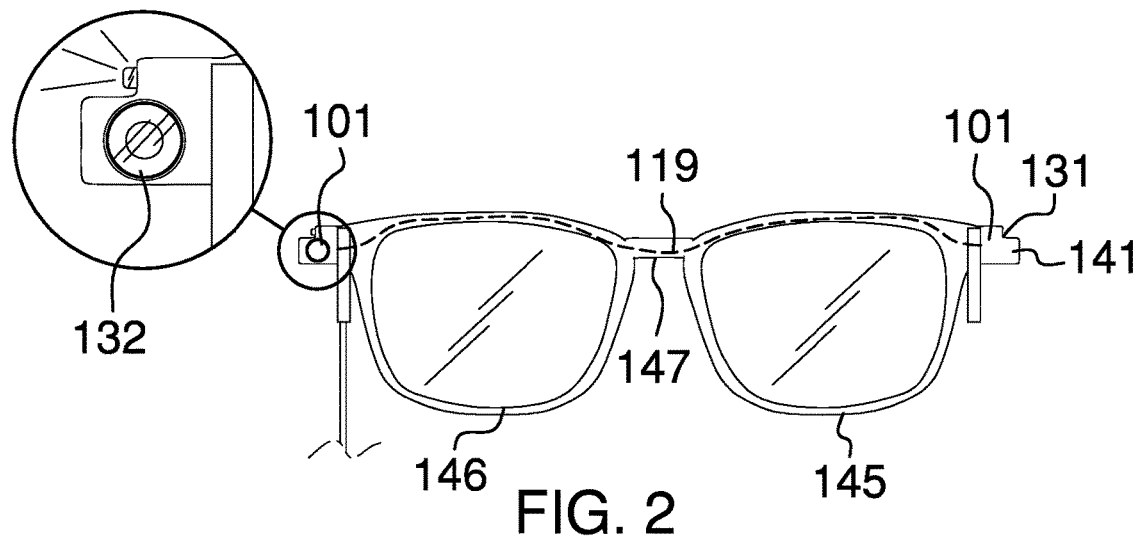
FIG. 2 is a back view of an embodiment of the disclosure.
Figure 3:
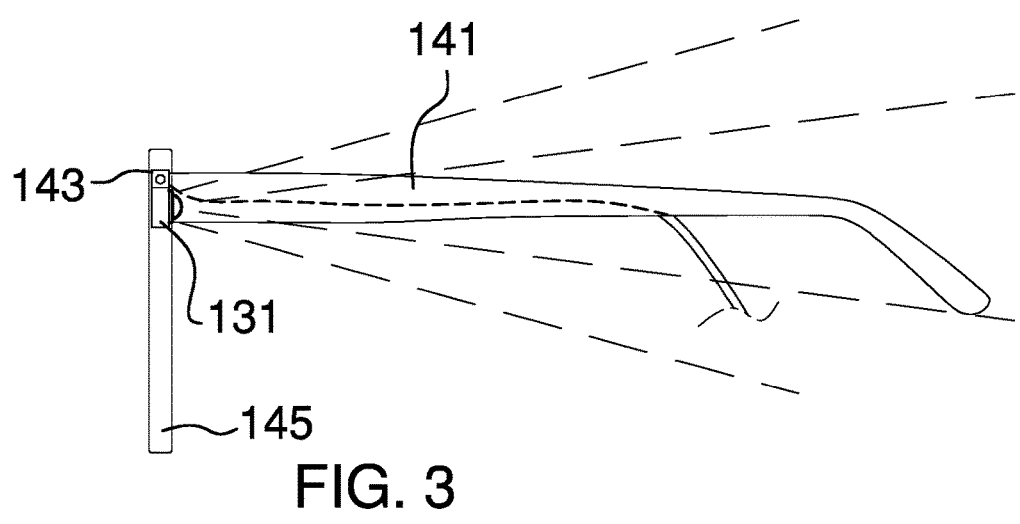
FIG. 3 is a left side view of an embodiment of the disclosure.
Figure 4:
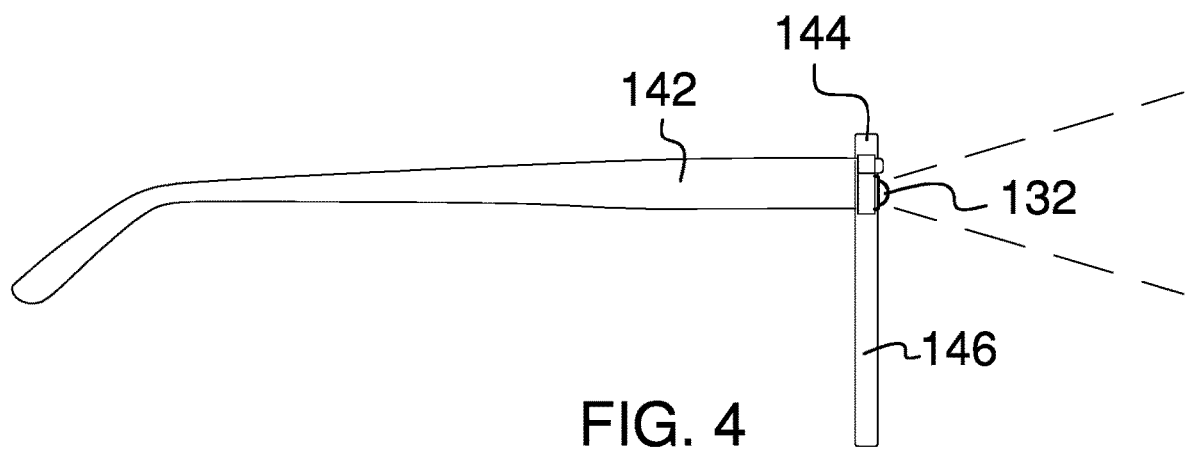
FIG. 4 is a right view of an embodiment of the disclosure.
Figure 5:
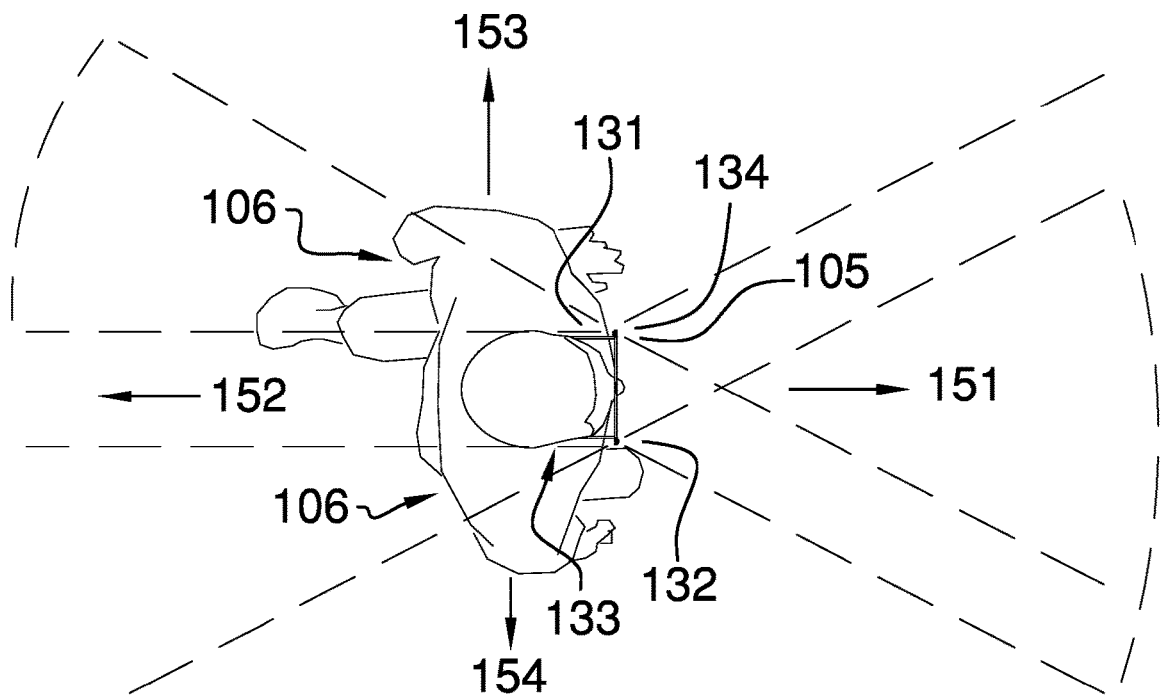
FIG. 5 is an in use view of an embodiment of the disclosure.
Figure 6:
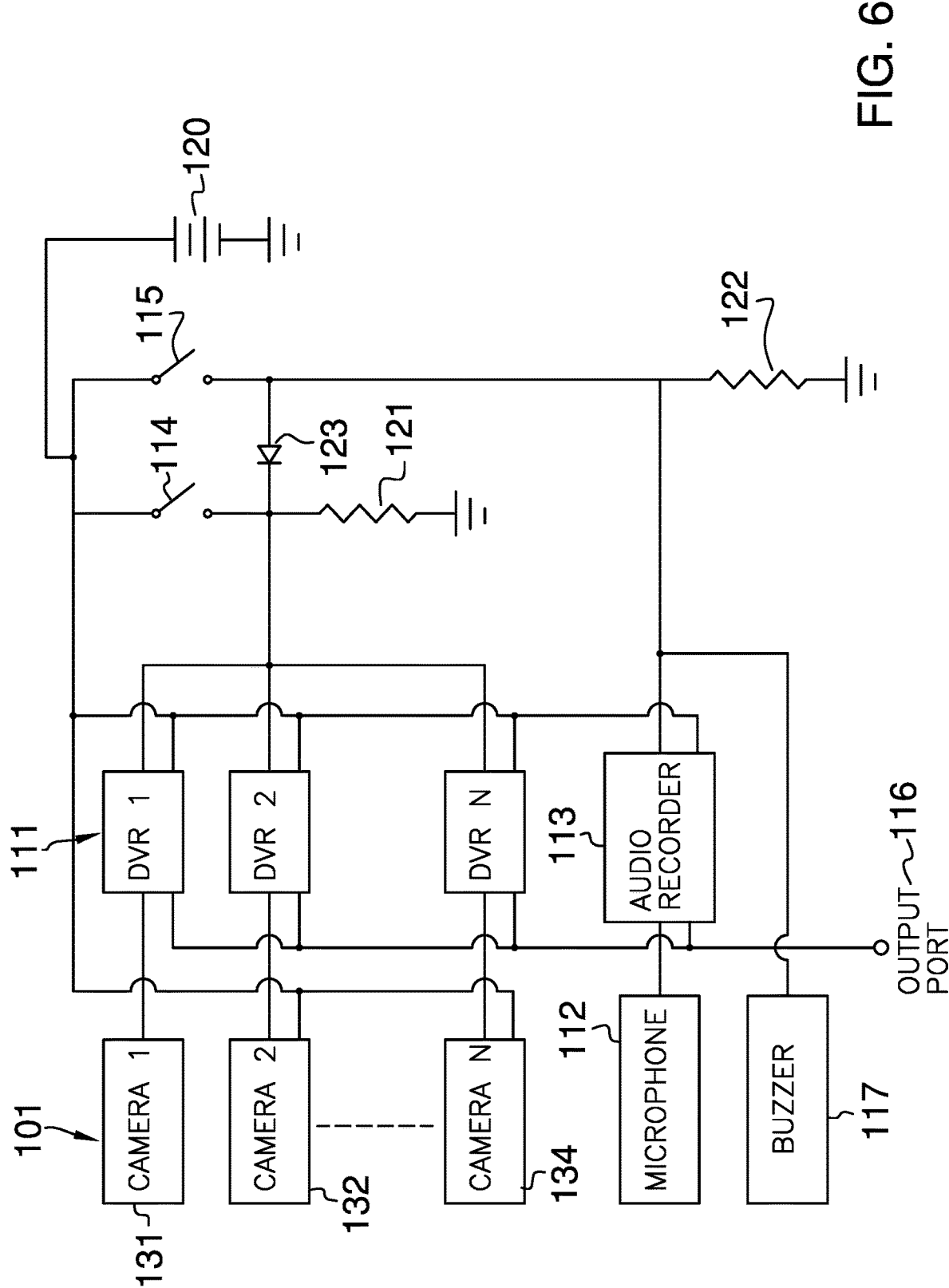
FIG. 6 is a block diagram of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The camera glasses 100 (hereinafter invention) comprises a plurality of cameras 101, eyeglasses 102, and a recording unit 103. The invention 100 is a personal security device that is adapted for use with eyeglasses 102. The eyeglasses 102 are fitted with the plurality of cameras 101 that are configured to record the surroundings of the user 150. Each of the plurality of cameras 101 are mounted on the eyeglasses 102 such that one or more front cameras 105 capture images of the activities in front 151 of the user 150 while one or more back cameras 106 capture images of the activities behind 152 the user 150. The invention 100 may be placed in a recording mode. Alternatively a panic switch 115 is provided that will initiate video recordings from all of the plurality of cameras 101. In addition, the panic switch 115 will initiate an audio recording of the situation and activate an audible alarm in order to draw attention to a potentially dangerous situation. The plurality of cameras 101 are mounted on the eyeglasses 102. The invention 100 is controlled using the recording unit 103. The recording unit 103 is attached to the plurality of cameras 101 using a cable 119. The cable 119 is discussed in detail elsewhere in this disclosure.

The eyeglasses 102 are readily and commercially available eyeglasses 102 that are modified for use with the invention 100. The eyeglasses 102 are further defined with a left temple 141, a right temple 142, a left hinge 143, a right hinge 144, a left lens 145, a right lens 146, and a bridge 147. The left hinge 143 attaches the left temple 141 to the left lens 145. The right hinge 144 attaches the right temple 142 to the right lens 146. The bridge 147 joins the left lens 145 to the right lens 146.

Each of the plurality of cameras 101 is an electrical sensor that visually captures images of the surroundings of the user 150. Each of the plurality of cameras 101 is a pinhole camera. Pinhole cameras are also commonly referred to as mini-cameras, micro-cameras, or spy cameras. The plurality of cameras 101 are further organized into two sub-groups referred to as the one or more front cameras 105, and the one or more back cameras 106. Each of the one or more front cameras 105 is designated to capture images of the surroundings of the user 150 that occur in front 151 of the user 150. Each of the one or more back cameras 106 designated to capture images of the surroundings of the user 150 that occur behind 152 the user 150. The invention 100 is always configured such that at least one camera selected from the plurality of cameras 101 is assigned to the one or more front cameras 105. Similarly, the invention 100 is always configured such that at least one camera selected from the plurality of cameras 101 is assigned to the one or more back cameras 106. The one or more back cameras 106 comprises a first camera 131 and the one or more front cameras 105 comprises a second camera 132.

In a first potential embodiment of the disclosure, the first camera 131 is mounted on the left lens 145 of the eyeglasses 102 just above the left hinge 143 and the second camera 132 is mounted on the right lens 146 of the eyeglasses 102 just below the right hinge 144. Methods to attach objects to lenses of eyeglasses 102 are well known and documented in the mechanical arts.

In a second potential embodiment of the disclosure, the invention 100 further comprises one or more lights 104. Each of the one or more lights 104 is a light source that is used to illuminate the surroundings in order to improve the quality of the images captured by a set of cameras selected from the group consisting of the one or more front cameras 105 or the one or more rear cameras 106. In the second potential embodiment of the disclosure, the one or more lights 104 are further organized into a front light 107 and a rear light 108. The front light 107 is positioned to illuminate the surroundings in front 151 of the user 150. The rear light 108 is positioned to illuminate the surroundings in behind 152 of the user 150. In instances wherein the one or more lights 104 comprises only a single light the single light is used as the front light 107. In the second potential embodiment of the disclosure, as shown most clearly in FIG. 4, the one or more lights 104 comprises only the front light 107. The front light is mounted via the right hinge 144 just above the second camera 132. As shown most clearly in FIG. 6, the one or more lights 104 are illuminated when the plurality of cameras 101 are in operation. In the first potential embodiment of the disclosure, the front light 107 comprises a readily and commercially available high lumen LED. Such LEDs are often marketed as ultra-bright or high power. In subsequent embodiments of the disclosure, a switch may be incorporated into the recording unit 103 such that the one or more lights 104 may be turned off when not required for capturing images.

Each of the plurality of cameras 101 is connected to the recording unit 103. The preferred connection method is the use of a cable 119. A cable 119 is preferred because: 1) of the superior quality and security of the transmission of the images delivered to the recording unit 103 by each of the plurality of cameras 101 relative alternative transmission methods; and, 2) the relative ease of providing power to the plurality of cameras 101 over a cable 119.

The recording unit 103 comprises a plurality of DVR channels 111, a microphone 112, an audio channel 113, a record switch 114, a panic switch 115, an output port 116, a speaker 117, a housing 118, the cable 119, and a power source 120, a first resistor 121, a second resistor 122, and a diode 123. The power source 120, the record switch 114, the panic switch 115, the first resistor 121, the second resistor 122, and the diode 123 forms a circuit that operates the plurality of DVR channels 111, the audio channel 113, and the speaker 117. Each camera selected from the plurality of cameras 101 is connected to a DVR channel selected from the plurality of DVR channels 111. The audio channel 113 is connected to the microphone 112. Each of the plurality of DVR channels 111 and the audio channel 113 are connected to the output port 116. As shown in FIG. 1, the power source 120 further provides power to each of the plurality of cameras 101, each of the plurality of DVR channels 111, and the audio channel 113. The cable 119 is used to connect each of the plurality of cameras 101 to: 1) a DVR channel selected from the plurality of DVR channels 111; and 2) to the power source 120.

Each of the plurality of DVR channels is an individual DVR 111 that is dedicated to recording the images gathered by the corresponding camera. In the first potential embodiment of the disclosure the function of the plurality of DVR channels 111 is provided through a commercially available single device that supports the recording of multiple video channels. The microphone 112 is a commercially available transducer that converts the pressure generated by audible sounds into electronic signals. The audio channel 113 is a commercially available audio recording device. The output port 116 is a collection of one or more external connections provided by the recording unit 103 to allow for the plurality of DVR channels 111 and the audio channel 113 to download recorded data to an external device 155. Methods to design and record audio channels 113 and output ports 116 are well known and documented in the electrical arts. The speaker 117 is a transducer that converts an electrical signal into an audible sound. The housing 118 is a rigid casing within which recording unit 103 is stored. The use of housings 118 is well known and documented in the electrical arts. The power source 120 is a commercially available battery. The record switch 114 and the panic switch 115 are both single pole single throw switches. The first resistor 121, the second resistor 122, and the diode 123 are readily and commercially available components.

The final connections and the operation of the recording unit 103 are as follows. The power source 120 is placed in a series circuit with the record switch 114 and the first resistor 121. When the record switch 114 is closed a measurable voltage drop is generated across the first resistor 121. The plurality of DVR channels 111 are connected to the first resistor 121 such that they can detect the voltage across the first resistor 121. Upon detecting the voltage across the first resistor 121, the plurality of DVR channels 111 begin recording the images collected by the plurality of cameras 101. The diode 123 prevents current flowing through the record switch 114 from flowing to the second resistor 122. When the panic switch 115 is closed a measurable voltage drop is generated across the first resistor 121 and the second resistor 122. Upon detecting the voltage across the first resistor 121, the plurality of DVR channels 111 begin recording the images collected by the plurality of cameras 101. Upon detecting the voltage drop across the second resistor 122: 1) the audio channel 113 begins recording signals generated by the microphone 112; and, 2) the speaker 117 is powered in order to generate an audible alarm sound.

In a second potential embodiment of the disclosure, the one or more front cameras 105 further comprises a third camera 133 and the one or more back cameras 106 comprises a fourth camera 134. The fourth camera 134 is mounted on the left lens 145 of the eyeglasses 102 just above the first camera 131 and the third camera 133 is mounted on the right lens 146 of the eyeglasses 102 just above the second camera 132.

Methods to assemble the recording unit 103 and to connect the recording unit 103 to the plurality of cameras 101 are well known and documented in the electrical arts. In the first potential embodiment of the disclosure, the recording unit 103 integrated a multichannel DVR with the electronic circuits such as microcontrollers and shields sold under the trademark Arduino. In the first potential embodiment of the disclosure, the speaker 117 is a readily and commercially available buzzer.

The following definitions and directional references were used in this disclosure:

Battery: As used in this disclosure, a battery is a container consisting of one or more cells, in which chemical energy is converted into electricity and used as a source of power.

Buzzer: As used in this disclosure, a buzzer is two lead electrical device that generates an audible sound when voltage is applied to the two leads.

Cable: As used in this disclosure, a cable is a collection of insulated wires covered by a protective casing that is used for transmitting electricity or telecommunication signals.

Diode: As used in this disclosure, a diode is a two terminal semiconductor device that allows current flow in only one direction. The two terminals are called the anode and the cathode.

DVR: As used in this disclosure, DVR is an acronym for a digital video recorder. A DVR is an electronic memory device that records and stores in real time video and audio signals electronically.

Image: As used in this disclosure, an image is an optical representation of the appearance of something or someone.

LED: As used in this disclosure, an LED is an acronym for a light emitting diode. A light emitting diode is a diode that is also a light source.

Microphone: As used in this disclosure, a microphone is an electrical device that converts an audible sound into an electrical signal.

Port: As used in this disclosure, a port is an electrical termination that is used to connect a first electrical circuit to a second external electrical circuit. In this disclosure, the port is designed to receive a plug.

Sensor: As used in this disclosure, a sensor is a device that receives and responds in a predetermined way to a signal or stimulus.

Speaker: As used in this disclosure, a speaker is an electrical device that converts an electrical signal into an audible sound.

Transducer: As used in this disclosure, a transducer is a device that converts a physical quantity, such as pressure or brightness into an electrical signal or a device that converts an electrical signal into a physical quantity.

The directional references used in this disclosure correspond to the directional references from the perspective of the user. As such, left 153 refers to the direction towards the left 153 side of the user and right 154 refers to the direction towards the right 154 side of the user. Front 151 refers to the direction the user is facing. Behind or back 152 refers to the direction opposite to the front direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A personal security device comprising:
a plurality of cameras, eyeglasses, and a recording unit;
wherein the personal security device is adapted for use with eyeglasses;
wherein the plurality of cameras are mounted on the eyeglasses;
wherein the plurality of cameras are controlled by the recording unit;
wherein the plurality of cameras are configured to record the surroundings of the user;
wherein a cable connects the plurality of cameras to the recording unit;
wherein the plurality of cameras are configured such that the plurality of cameras capture images in front of the user;
wherein the plurality of cameras are configured such that the plurality of cameras capture images behind the user;
wherein the personal security device makes audio recordings;
wherein the personal security device activates an audible alarm;
wherein the eyeglasses are further defined by a left temple, a right temple, a left hinge, a right hinge, a left lens, a right lens, and a bridge;
wherein each of the plurality of cameras is an electrical sensor that visually captures images of the surroundings of the user;
wherein each of the plurality of cameras is a pinhole camera;
wherein the plurality of cameras further comprises one or more front cameras, and the one or more back cameras;
wherein each of the one or more front cameras captures images in front of the user;
wherein each of the one or more back cameras captures images behind the user;
wherein the one or more front cameras comprises at least one camera;
wherein the one or more back cameras comprises at least one camera;
wherein the one or more back cameras comprises a first camera;
wherein the one or more front cameras comprises a second camera;
wherein the recording unit comprises a plurality of DVR channels, a microphone, an audio channel, a record switch, a panic switch, an output port, a speaker, a housing, the cable, and a power source, a first resistor, a second resistor, and a diode;
wherein the power source, the record switch, the panic switch, the first resistor, the second resistor, and the diode forms a circuit that operates the plurality of DVR channels, the audio channel, and the speaker;

wherein the audio channel is connected to the microphone;

wherein each of the plurality of DVR channels and the audio channel are connected to the output port;

wherein the power source further provides power to each of the plurality of cameras, each of the plurality of DVR channels, and the audio channel.

2. The personal security device according to claim 1 wherein each camera selected from the plurality of cameras is connected to a DVR channel selected from the plurality of DVR channels.

3. The personal security device according to claim 2 wherein the cable is used to connect each of the plurality of cameras to DVR channel selected from the plurality of DVR channels;

wherein the cable is used to connect each of the plurality of cameras to the power source.

4. The personal security device according to claim 3 wherein each of the plurality of DVR channels is a DVR that is dedicated to recording the images gathered by the associated camera.

5. The personal security device according to claim 4 wherein the audio channel is an audio recording device.

6. The personal security device according to claim 5 wherein the output port is a collection of one or more external connections.

7. The personal security device according to claim 6 wherein the speaker is a buzzer;

wherein the record switch is a single pole single throw switch;

wherein the panic switch is a single pole single throw switch.

8. The personal security device according to claim 7 wherein the power source is placed in a series circuit with the record switch and the first resistor;

wherein the each of the plurality of DVR channels are connected to the first resistor.

9. The personal security device according to claim 8 wherein the power source is placed in a circuit with the panic switch, the first resistor, the second resistor, and the diode;

wherein the diode is attached between the panic switch and the first resistor such that the diode prevents current from flowing through the record switch to the second resistor;

wherein the audio channel is connected to the second resistor;

wherein the buzzer is connected to the second resistor.

10. The personal security device according to claim 9 wherein the first camera is mounted on the left lens of the eyeglasses.

11. The personal security device according to claim 10 wherein the second camera is mounted on the right lens of the eyeglasses.

12. The personal security device according to claim 11 wherein the personal security device further comprises one or more lights;

wherein each of the one or more lights is a light source;

wherein each of the one or more lights is associated with a set of cameras selected from the group consisting of the one or more front cameras or the one or more rear cameras;

wherein the one or more lights are further organized into a front light and a rear light;

wherein the one or more lights comprises at least one light that is used as the front light.

13. The personal security device according to claim 12 wherein the one or more back cameras further comprises a fourth camera;

wherein the one or more front cameras further comprises a third camera.

14. The personal security device according to claim 13 wherein the third camera is mounted on the right lens of the eyeglasses below the second camera;

the fourth camera is mounted on the left lens of the eyeglasses below the first camera.

15. The personal security device according to claim 14 wherein the front light is mounted above the second camera;

wherein the front light comprises a high lumen led;

wherein the first camera is mounted on the left lens of the eyeglasses.

* * * * *